Patented Nov. 24, 1936

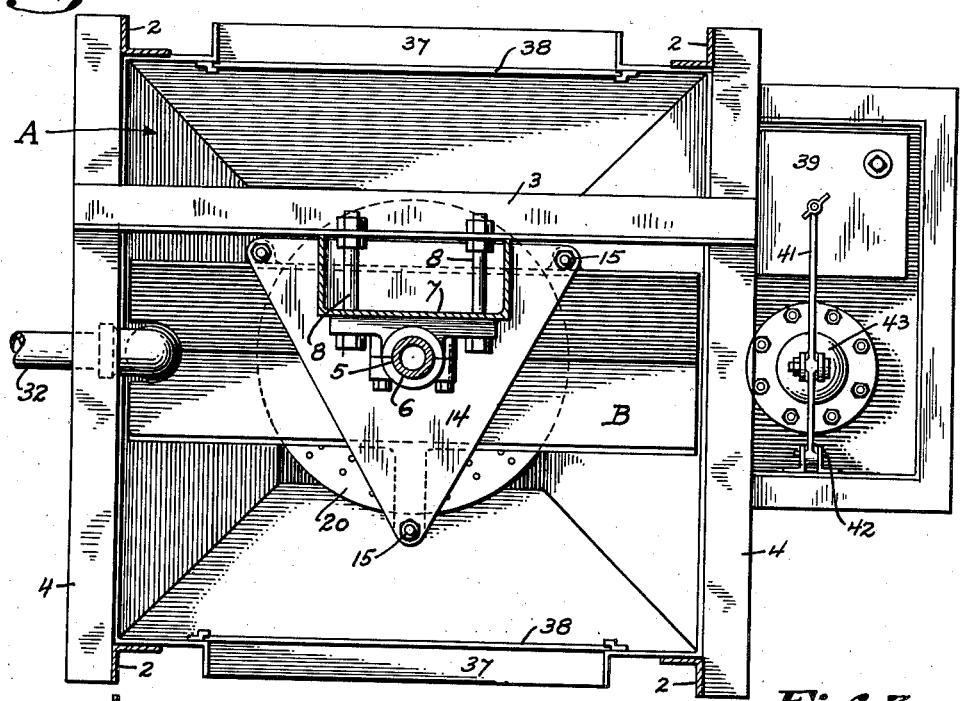
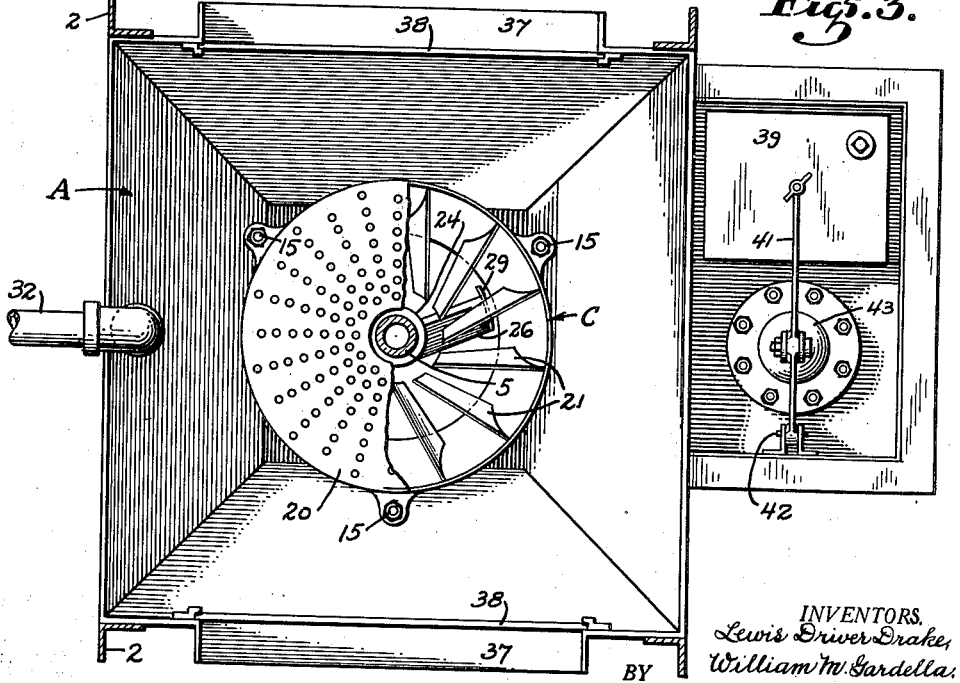

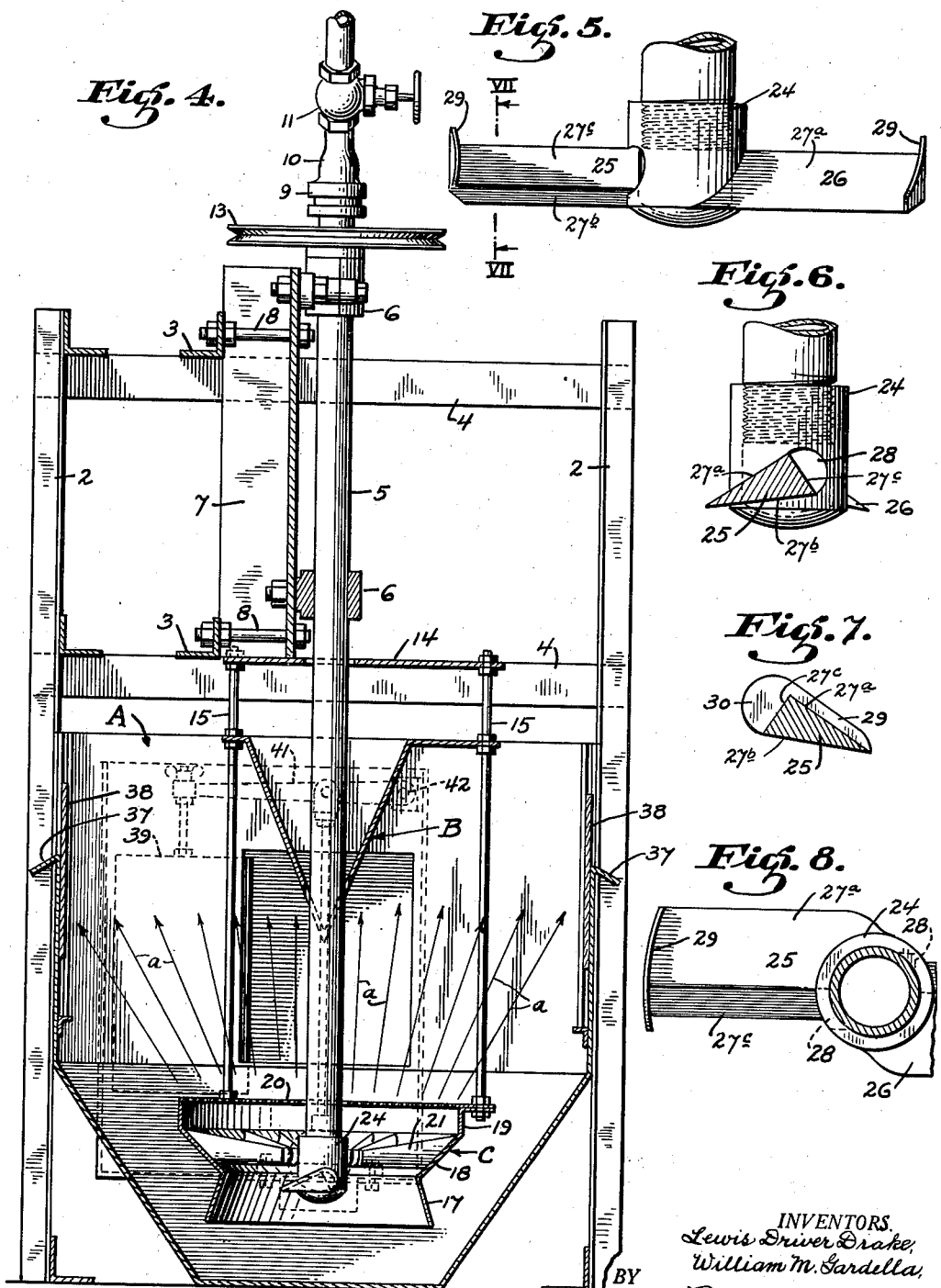

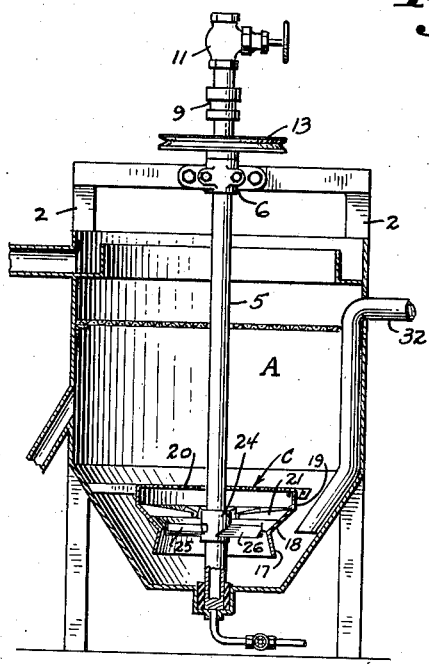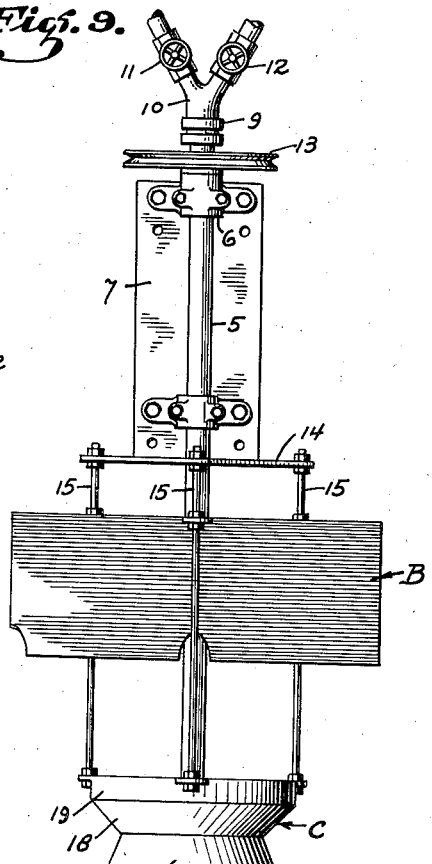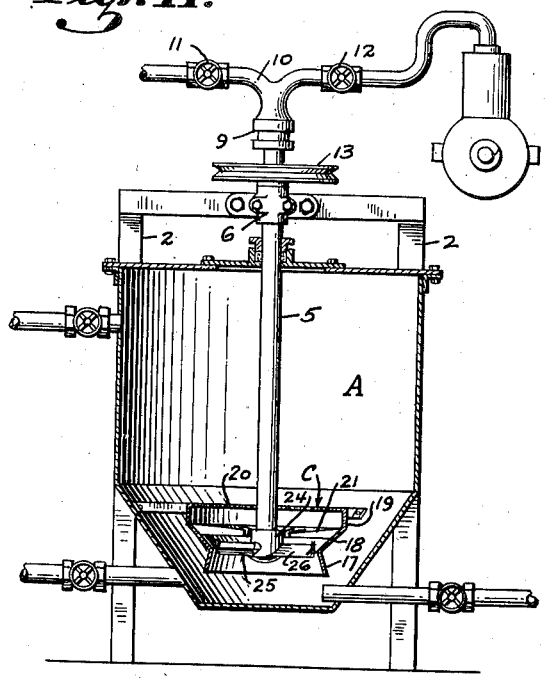

2,061,564

UNITED STATES PATENT OFFICE 2,061,564

DIFFUSION IMPELLER DEFLECTOR

Lewis Driver Drake, Mountain View, and William M. Gardella, Oakland, Calif.; said Gardella assignor of one-third to said Drake Application August 29, 1934, Serial No. 742,016
Renewed December 5, 1935

17 Claims. (Cl. 261—93)

This invention relates to an apparatus, whereby thorough diffusion and mixing of two or more fluid substances, whether in a liquid or gaseous form, or both, may be insured.

There are many operations in the metallurgical, chemical and other fields which require thorough diffusion and mixing of one or more fluid substances, whether in a liquid or gaseous state, or both. Among such operations may be mentioned, ore flotation cyanidation, aeration of sewage, yeast, malt, carbonation of sugar beet juice, and saline solutions in the manufacture of certain alkalis, etc.

The above operations illustrate the introduction and mixing of a gaseous substance with a liquid, but in other operations, for instance in the purification of water, chemicals in solution are mixed with the water to lower the bacteria content, to reduce algae growths, etc. In that instance a liquid is introduced into a liquid, but, even so, thorough diffusion or mixing is necessary to obtain the best results. In fact, many operations can be mentioned where a gas or liquid substance may be diffused and mixed with another fluid, but the above operations are thought sufficiently illustrative for the purpose involved.

The object of the present invention is to generally improve and simplify the construction and operation of apparatus, whereby thorough diffusion or mixing of two or more fluid substances, whether in a liquid or gaseous state, or both, may be insured; to provide an apparatus for the purpose described which is simple, compact and substantial in construction; to provide an apparatus for the purpose described in which power consumption is reduced to a minimum; to provide an apparatus whereby materials varying widely in physical and chemical character may be efficiently handled; to provide an apparatus which is flexible and adjustable to take care of varying conditions, materials or substances; and, further, to provide an apparatus which is efficient in operation, whether operating on a small or a large capacity scale.

The invention is shown by way of illustration in the accompanying drawings, in which:

Fig. 2 is a plan view, in section, taken on the line II—II of Fig. 1.

Fig. 3 is a plan view, in section, taken on the ine III—III of Fig. 1.

Fig. 4 is a vertical section, taken at right angles to Fig. 1.

Fig. 5 is an enlarged view of the impeller, showing the same in side elevation.

Fig. 6 is an end view of the impeller, said view showing one of the impeller blades in section.

Fig. 7 is a cross section of one of the impeller blades, taken on the line VII—VII of Fig. 5.

Fig. 8 is a partial plan view of the impeller shown in Fig. 5.

Fig. 9 is a side elevation, showing the removable unit, including the drive mechanism, the froth discharger, the impeller and the deflector enclosing the same.

Fig. 10 is a side elevation, in section, showing the apparatus applied to an aeration tank.

Fig. 11 is a view, in side elevation, showing the apparatus applied to a pressure operating system.

Figure 1:
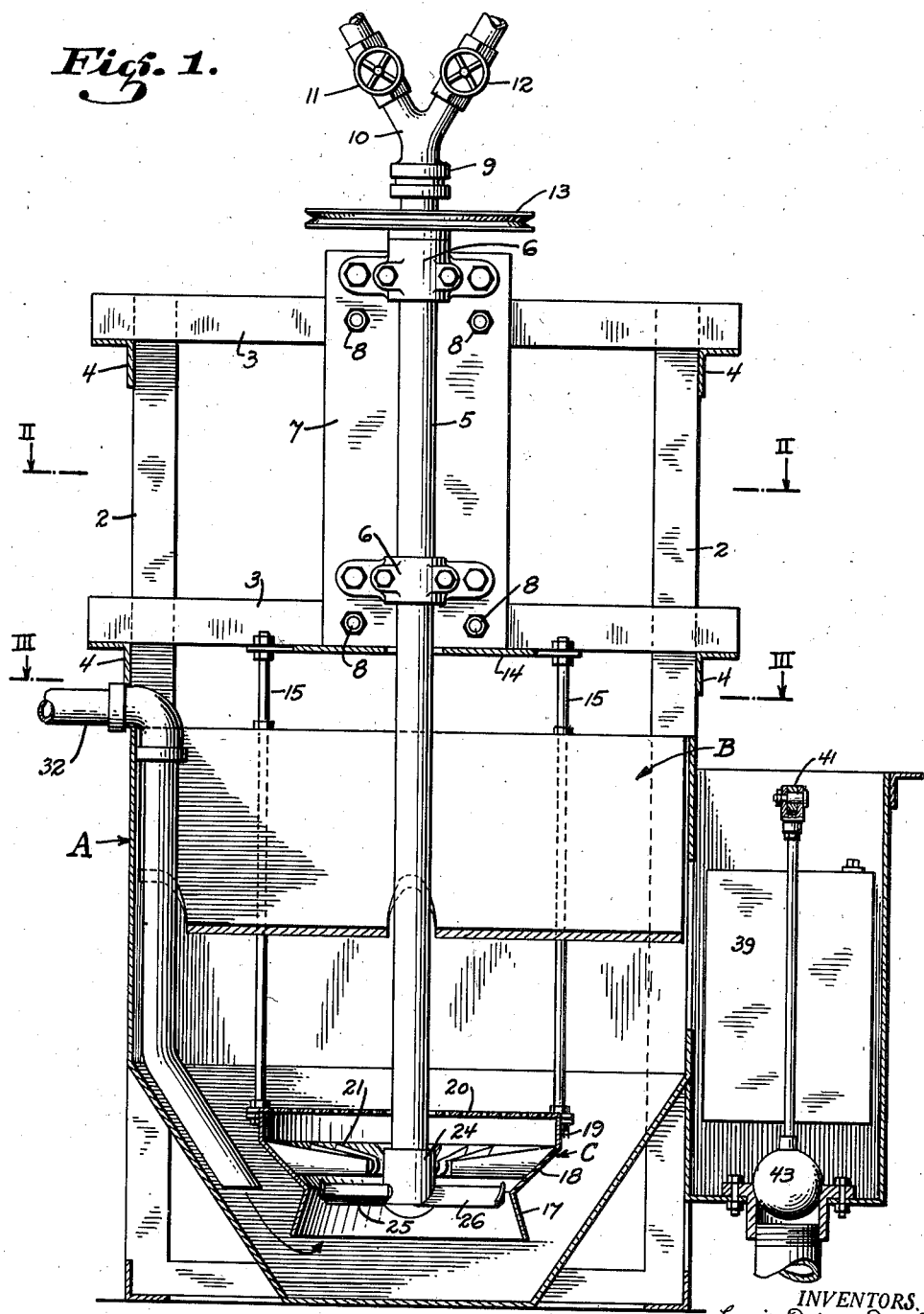
Fig. 1 is a side elevation, in section, showing the apparatus as applied to an ore flotation cell.

Referring to the drawings in detail, and particularly Figs. 1 to 4, inclusive, A indicates the tank of an ore flotation cell. The tank shown in the present instance is rectangular or square in form and it is supported at opposite corners by a steel frame, consisting of a plurality of vertically disposed angle bars 2. These bars extend a considerable distance above the tank or cell and they are connected at intervals by upper and lower cross bars 3—3 and also by longitudinally extending bars 4—4. The frame serves two functions, first, as a support for the tank or cell A, and, second, as a support for a removable unit hereinafter to be described.

The unit consists of a hollow drive shaft, indicated at 5, which is supported in bearings 6—6. These bearings are secured to a channel-shaped frame 7 and this is, in turn, secured to the cross bars 3—3 by means of stud bolts 8—8. Disposed adjacent to the upper end of the hollow drive shaft is a stuffing box 9, and connected therewith is a multi-branched manifold 10, on which are mounted regulating or controlling valves 11 and 12. The shaft is driven by means of a pulley 13 through an electric motor, or any other suitable drive, and the speed of rotation will be changed to suit varying conditions and materials.

Welded, or otherwise secured, to the lower end of the channel frame 7 is a substantially triangular-shaped plate 14, and secured thereto and extending downwardly into the tank or cell A are three suspension rods 15, intermediate the ends of which is secured a froth discharger, generally indicated at B, and from the lower ends of which is suspended a deflector C, in which is mounted an impeller and a plurality of deflector vanes. The deflector consists of a lower frustrum of a cone, expanded end downward as indicated at 17, and an upper frustrum of a cone, expanded end upward as at 18. To the upper end of this cone is secured a shallow ring 19, and on top thereof is mounted a cover consisting of a screen or perforated plate 20. This cover has a central opening formed therein for the shaft 5 to pass through, and the perforations formed in the plate will be numerous so as to permit the discharge from the impeller to pass freely therethrough. Broadly speaking the deflector is Venturi shaped or circumferentially contracted at a point intermediate its ends and within the upper portion of the deflector is secured a plurality of tapering transposition curved deflector blades 21, the top edges of said blades being positioned so as to become approximately tangent to the exterior of the shaft 5.

The open downward flared and expanding lower portion of the deflector, or, in other words, the cone 17, gives the impeller maximum volume of feed essential for rapid recirculation of the contents of the cell or tank A. It further confines the effect of cavitation to the rear edges of the impeller blades, as will hereinafter be described. The expanded upper portion of the deflector serves the function of expanding the discharge from the impeller and slowing down the velocity of the circulating liquid, and it also functions to insure even distribution.

The tapered, curved transposition deflector blades 21, whose top edges are approximately tangent to the shaft 5, serve the function of changing the liquid circulating and discharging upwardly by the impeller from an ascending spiral path to a vertical radiating one. The taper of the blades takes care of variations in impeller discharge tangent to the shaft and the transposition curve of the blades makes diversion from an ascending spiral to a vertical radiating column, possible without impact vibration, such as is encountered where flat deflector blades are employed. Such blades are froth destroying, particularly when certain metallics are encountered, but by employing the tangent transposition taper blades here illustrated impact action and the destruction of froth is avoided. The position assumed by the top of the deflector blades checks vortex formation when less than normal air is used and the perforated cover 20 serves the function of subdividing the streams discharged between the deflector blades into a multiplicity of small divisions under mild pressure, thus securing an even distribution of the liquid circulated and a quiet pulp level action.

An annular space is made between the inner ends of the deflector vanes or blades, and the shaft 5 extends downwardly through this space so as to support the impeller which is positioned at a point intermediate the deflector sections 17 and 18 or at a point just below the blades 21.

The form of impeller employed is best shown in Figs. 5 to 8, inclusive. It consists of a hollow hub member 24, on which is formed a pair of oppositely disposed, radially extending impeller blades 25 and 26. The blades are identical in length and cross section, a cross section of one of the blades being shown in Figs. 6 and 7. From these cross sections it will be noted that the blades are solid. Each blade is provided with a front inclined impelling surface 27a, a bottom surface 27b, and a rear surface 27c which is disposed substantially at right angles to the inclined impelling surface 27a. The inclined surface functions as an impeller surface and forces the liquid or fluid medium being handled in an upward direction through the vanes or deflector blades 21. As the impeller blades in most instances will rotate at a fairly high speed, say, from a few hundred to several thousand revolutions per minute, cavitation will be produced behind the blades. Such cavitation is nothing more nor less than a vacuum pocket and would, under ordinary conditions, create a considerable drag and thereby increase the power consumption required to drive the impeller.

In the present instance the vacuum is relieved and beneficial results are obtained at the same time. This is accomplished by forming a pair of openings in the impeller hub, such as indicated at 28. These openings align with the inner ends of the impeller blades and with the rear edge thereof and permit air to be sucked or drawn through the hollow shaft and hub and to pass out through the openings to flow along the rear edges of the blades and thereby relieve the vacuum and materially lessen the power required to rotate the impeller.

The holes 28 may be roughly shaped to conform to those produced by cavitation or vacuum back of each blade. By natural action the greatest cavitation will, obviously, be formed at the outer ends where the peripheral speed is the greatest. The total cavitation of each blade pulls the fluid through the hole in the hub and then the highest cavitation near the end of the blade pulls the fluid through zones of the lower cavitation near the hub to satisfy the strongest pull. The fluid enroute from the lowest to the highest points of cavitation along the rear of the blade is available to the lower zones of cavitation, so they take what they require and no more, giving uniform, automatic distribution.

By referring to Figs. 5, 7 and 8, it will be noted that a rib is placed at the outer end of each impeller blade. The rib projects above the inclined impeller surface, as shown at 29, and it also projects rearwardly of the edge, as indicated at 30 forming ears substantially the shape of the cavitation pocket. These ribs prevent end slippage on the impelling surfaces and they also prevent the escape of air in a direction longitudinally to the blades and insure a better uniformity in the circulation of the liquid in the cell and of the diffusion of the air or other fluid induced by cavitation.

The air or other fluid medium to be diffused and mixed with the pulp or other material to be treated in the cell or tank A may enter by the suction action produced behind the rear edges of the blades of the impeller and the volume or amount admitted may be controlled by the valves carried by the manifold. Under certain conditions the air or other fluid medium introduced may be supplied under pressure from a compressor, a blower or the like, and regulation is obtained by adjustment of the valves. In other instances it may be desirable to introduce two or more fluid substances, and it is for this reason that a multi-branched manifold is provided with a regulating valve on each branch thereof.

In actual operation, the ore pulp or other material to be treated is admitted to the tank A through a feed pipe 32 (see Fig. 1). The feed pipe extends substantially to the bottom of the tank or cell and the material is thus delivered to a point where it cannot pass except through the suction end of the deflector enclosing the impeller. The impeller is driven at a desired or required speed through means of the pulley 13. A suction action will be produced below the impeller and the solid material contained in the pulp will accordingly move upwardly with the stream of liquid maintained in circulation by the rotation of the impeller. At the same time a vacuum is formed behind the rear edge of each blade of the impeller and if air is being introduced and regulated by one or another of the valves, indicated at 11 and 12, the vacuum will be relieved and air will enter.

In some instances a fairly coarse froth is desired; that is, a froth consisting of bubbles of a fairly large size, and in other instances froth is desired containing bubbles which are smaller, etc. The size of the bubbles depends on the physical and chemical character of the ore or material being treated. In the present instance the size of the bubbles is regulated by the impeller speed, the amount of air allowed to enter, and the number and size of holes in the cover plate 20 of the deflector.

As the solid material in the pulp passes upwardly with the circulating liquid medium, the mineral particles will come in contact with the bubbles formed and will be floated to the surface, it being understood that the reagents required for flotation and froth formation will be automatically fed to and mixed with the pulp prior to, during delivery to, or in the cell. The circulation continues and any mineral particles that have not encountered acceptable bubbles capable of floating them will obviously settle toward the bottom. Such mineral particles on their way toward the bottom of the cell and recirculated through the impeller must pass through the diffused ascending discharge of the impeller as the discharge from the impeller upwardly through the deflector is a vertically expanding column, as indicated by the arrows $a$. Thus the particles which tend to descend are checked by the upwardly ascending liquid and bubbles and the bulk of the material, inclined to float but not being in condition to float due to lack of attachment to sufficient air, will be maintained in a zone above the deflector discharge and below the pulp level until the proper bubbles are contacted and the material is floated. By holding these floatable particles in the ascending path of bubbles and upwardly circulating liquid they are held in the zone of greatest possible contact with the air bubbles and flotation of the floatable material is thereby speeded. Other heavy floatable particles which are not ready to float, due to insufficient bubble attachment, will settle to the bottom to be recirculated and during several turnovers will become attached to bubbles sufficiently large to float the same.

This is of material importance as it will lessen the number of cells in series. The froth collects on the surface of the cell in the usual manner and discharges over the froth lips 37, and the depth of the froth maintained may be adjusted by a froth level gate, such as indicated at 38, and the intensity of the bubble column adjusted, in combination with the froth depth, by simultaneous adjustment of the froth discharger B and the gate 38.

In floating certain metallics and with some other pulps, it is desirable to discharge the froth as soon as possible. To this end the V-shaped froth discharger B is employed. This is adjustable on the rods 15 and serves two functions: first, it deflects or directs the froth rapidly towards the discharge lips and insures a rapid discharge of the froth once it reaches the surface of the pulp level; and, second, it assists in controlling the depth of the froth where a concentrated supporting bubble column of extreme depth is essential. The liquid level in the cell is maintained in the usual manner by a float 39, disposed in a compartment adjacent to the main cell. The float actuates a float lever 41, pivoted at 42. This is, in turn, connected with the usual float valve 43 and as the liquid level rises the float rises and so does the valve 43, thereby permitting automatic discharge both of the liquid and of the tailings which are constantly discharging from the cell into the float chamber.

In the present instance only one cell is shown, but, obviously, two or more cells may be connected in series as is common practice.

The lower power requirements of a flotation cell, such as here shown, are due to the addition of air behind the impeller blades, the expansion of the deflector to accommodate a greater volume. It is also due to the addition of the air, the air lift effect of the air added to the rising liquid column, and the low static head of pumping of the impeller.

In Figs. 10 and 11 modified forms of the apparatus or machine are shown. An apparatus suitable for the cyanidation of slimes is best illustrated in Fig. 10. The pulp is obviously agitated and kept moving, together with the cyanide solution, and the air is introduced by means of the impeller, as previously described. The air entering is essential to promote the dissolving action of cyanide solution on gold and silver. Common practice is generally that of introducing air from a source of pressure, such as a compressor in an air lift, or introducing air under pressure with a revolving distributor, and in some instances with an impeller with a vortex or some combination of the two. The bubbles are coarse; diffusion is scattered; the dissolving action is slow; and compressor cylinder oil contaminated air is often used.

By employing the type of impeller shown in the present application diffusion is thorough, as the volume of air admitted is better diffused. It is introduced at a much lower cost, as far as power consumption is concerned, the air bubbles are smaller, there is greater contact between the ore solution, and air is obtained with a greater increase in the speed with which the metals are dissolved. Higher extraction can also be expected and compressor cylinder oil contamination is entirely avoided.

A large proportion of city water is aerated in the course of treatment. The type of apparatus shown in Fig. 10 can also be employed for this purpose, but where the water is pumped from wells it should be understood that the impeller shown in this application can be secured directly to the pump shaft at a point above the deep well pump or incorporated in the discharge of the pump impeller, thus aerating the water as it rises up through the well casing.

In all the illustrations so far submitted the cell or tank in which the pulp or material has been treated is shown as open to the atmosphere. It should be understood that pressure operation is sometimes required, and in those cases the tank or cell should be closed, as shown in Fig. 11. Such an apparatus is suitable for the carbonation of sugar beet juice in the manufacture of beet sugar, carbonation of saline solutions in the manufacture of alkalies and numerous other applications in the technical arts where fast, even controlled diffusion of one or more fluid mediums is desired, could be mentioned.

The removable unit supporting the driving mechanism, the froth discharger, the deflector, the impeller, etc., are particularly shown in Fig. 9. It may be employed in different types of apparatus, but is in this instance particularly illustrated in connection with the flotation cell shown in Figs. 1 to 4, inclusive. While this and other features have been more or less specifically described and illustrated, we wish it understood that various changes may be resorted to within the scope of the appended claims; and similarly that the materials and finish of the several parts employed may be such as the manufacturer may decide or varying conditions or uses demand.

What we claim is:

1. In an apparatus of the character described, a fluid substance circulating and diffusion impeller comprising a hollow hub member secured to a hollow driving shaft, a plurality of solid impeller blades radially disposed from the hub, each blade presenting an inclined impelling surface and a rear edge disposed substantially at right angles to the impelling surface to form a cavitation pocket in the fluid substance behind each blade and located wholly exteriorly of the solid blade and said hub having a plurality of openings formed therein immediately behind the blades, one opening for each cavitation pocket, and in alignment therewith to supply a fluid to said cavitation pockets which is diffused by the impeller.

2. In an apparatus of the character described, a fluid substance, circulating and diffusion impeller comprising a hollow hub member secured to a hollow driving shaft, a plurality of solid impeller blades radially disposed from the hub, each blade presenting an inclined impelling surface and a rear edge disposed substantially at right angles to the impelling surface to form a cavitation pocket in the fluid substance behind each blade and said hub having a plurality of openings formed therein, one for each cavitation pocket, and in alignment therewith to supply a fluid to said cavitation pockets which is diffused by the impeller, and a rib on the outer end of each blade, said rib projecting above the impelling surface and rearwardly of the rear edge to prevent end slip on the impelling surface of the blades and also to prevent endwise escape along the rear edges of the blades of the induced fluid.

3. A diffusion and mixing device for diffusing and mixing one fluid medium with another, comprising a rotary impeller submerged in one fluid to cause circulation of said fluid, said impeller having a hollow hub and a plurality of solid impeller blades radially disposed from the hub, each blade presenting an upper inclined impelling surface, a lower upwardly inclined surface and a rear edge disposed substantially at right angles to the upper impelling surface to form a cavitation pocket in the fluid medium behind each blade and located wholly exteriorly of the solid blade, and said hub having a plurality of openings formed therein immediately behind the blades, one opening for each cavitation pocket, and in alignment therewith to supply a fluid to said cavitation pockets which is diffused and mixed with the first fluid during rotation of the impeller.

4. A diffusion and mixing device for diffusing and mixing one fluid medium with another, comprising a rotary impeller submerged in one fluid to cause circulation of said fluid, said impeller having a hollow hub and a plurality of solid impeller blades radially disposed from the hub, each blade presenting an inclined impelling surface and a rear edge disposed substantially at right angles to the impelling surface to form a cavitation pocket in the fluid medium behind each blade, and said hub having a plurality of openings formed therein, one for each cavitation pocket, and in alignment therewith to supply a fluid to said cavitation pockets which is diffused and mixed with the first fluid during rotation of the impeller, and a rib on the outer end of each blade, said rib projecting above the impelling surface and rearwardly of the rear edge to prevent end slip on the impelling surface and to prevent endwise escape of the induced fluid from the cavitation pockets.

5. A flotation apparatus of the character described, comprising a container for the reception of a liquid carrying solid matter to be floated, a vertically disposed deflector disposed adjacent to the bottom of the container, an impeller in the deflector whereby continuous upward circulation of the liquid and solids in the container is maintained and whereby air is introduced and mixed with the liquid in the container to form a froth, means for deflecting the mixture of liquid, solids and froth discharging upwardly from the deflector so that it will radiate as it ascends and form a cone-shaped rising column whereby solid matter tending to settle and return to the bottom of the container will have to descend through the rising column of liquid, solids and froth, and a V-shaped froth discharger extending crosswise of the surface of the container whereby froth collecting on the surface of the liquid is rapidly directed towards opposite sides of the container and discharged.

6. An apparatus of the character described, comprising a container for the reception of a fluid, a Venturi-shaped, vertically disposed deflector positioned adjacent to the bottom of the container and submerged in a fluid, said deflector being circumferentially contracted at a point intermediate its ends to form an expanded lower intake end and an expanded upper discharge end, a hollow drive shaft extending down into the container and the deflector mounted therein, an impeller secured on said shaft and positioned in the contracted portion of the deflector, said impeller having a plurality of solid blades, and a hollow hub with openings formed therein aligning with the rear edges of the impeller blades whereby, when the impeller is rotated, the fluid in the container is circulated upwardly through the deflector and cavitation pockets are formed in the fluid behind the rear edges of the blades so that a second fluid is induced to flow through the hollow shaft and the hub and which will pass through the openings in the hub and flow outwardly through the cavitation pockets and mix with the first named fluid.

7. An apparatus of the character described, comprising a container for the reception of a fluid, a Venturi-shaped, vertically disposed deflector positioned adjacent to the bottom of the container and submerged in a fluid, said deflector being circumferentially contracted at a point intermediate its ends to form an expanded lower intake end and an expanded upper discharge end, a hollow drive shaft extending down into the container and the deflector mounted therein, an impeller secured on said shaft and positioned in the contracted portion of the deflector, said impeller having a plurality of blades, a hollow hub with openings formed therein aligning with the rear edges of the impeller blades whereby, when the impeller is rotated, the fluid in the container is circulated upwardly through the deflector and cavitation pockets are formed behind the rear edges of the blades so that a second fluid is induced to flow through the hollow shaft and the hub and which will pass through the openings in the hub and flow outwardly through the cavitation pockets and mix with the first named fluid, and a plurality of vanes secured in the upper expanded portion of the deflector, said vanes in cross section forming a transposition curve, whereby fluid driven by the impeller and ascending in a spiral path is changed to a vertical radiating path.

8. An apparatus of the character described, comprising a container for the reception of a fluid, a Venturi-shaped, vertically disposed deflector positioned adjacent to the bottom of the container and submerged in a fluid, said deflector being circumferentially contracted at a point intermediate its ends to form an expanded lower intake end and an expanded upper discharge end, a hollow drive shaft extending down into the container and the deflector mounted therein, an impeller secured on said shaft and positioned in the contracted portion of the deflector, said impeller having a plurality of blades, a hollow hub with openings formed therein aligning with the rear edges of the impeller blades whereby, when the impeller is rotated, the fluid in the container is circulated upwardly through the deflector and cavitation pockets are formed behind the rear edges of the blades so that a second fluid is induced to flow through the hollow shaft and the hub and which will pass through the openings in the hub and flow outwardly through the cavitation pockets and mix with the first named fluid, a plurality of vanes secured in the upper expanded portion of the deflector, said vanes in cross section forming a transposition curve, whereby fluid driven by the impeller and ascending in a spiral path is changed to a vertical radiating path, and a perforated cover secured on the upper end of the deflector.

9. An apparatus of the character described, comprising a container for the reception of a fluid, a Venturi-shaped, vertically disposed deflector positioned adjacent to the bottom of the container and submerged in a fluid, said deflector being circumferentially contracted at a point intermediate its ends to form an expanded lower intake end and an expanded upper discharge end, a hollow drive shaft extending down into the container and the deflector mounted therein, an impeller secured on said shaft and positioned in the contracted portion of the deflector, said impeller having a plurality of blades, a hollow hub with openings formed therein aligning with the rear edges of the impeller blades, whereby, when the impeller is rotated, the fluid in the container is circulated upwardly through the deflector and cavitation pockets are formed behind the rear edges of the blades so that a second fluid is induced to flow through the hollow shaft and the hub and which will pass through the openings in the hub and flow outwardly through the cavitation pockets and mix with the first named fluid, a plurality of vanes secured in the upper expanded portion of the deflector, said vanes in cross section forming a transposition curve, whereby fluid driven by the impeller and ascending in a spiral path is changed to a vertical radiating path, and a V-shaped froth discharger disposed in the rising column of fluid.

10. In an apparatus of the character described, a fluid substance circulating and diffusing impeller comprising a hub, a plurality of solid impeller blades radially disposed from the hub, each blade presenting an inclined impelling surface and a rear edge disposed substantially at right angles to the impelling surface to form a cavitation pocket in the fluid substance behind each blade and located wholly exteriorly of the solid blade, and means for delivering a second fluid to each cavitation pocket directly from the periphery of the hub at a point immediately behind each blade.

11. A flotation apparatus of the character described, comprising a container for the reception of a liquid carrying solid matter to be floated, a vertically disposed deflector disposed adjacent to the bottom of the container, an impeller in the deflector whereby continuous upward circulation of the liquid and solids in the container is maintained and whereby air is introduced and mixed with the liquid in the container to form a froth, and means comprising a plurality of radially extending curved deflector blades for deflecting the mixture of liquid, solids and froth discharging upwardly from the deflector so that it will radiate as it ascends to fluid level and form a cone-shaped rising continuous column whereby solid matter tending to settle and return to the bottom of the container will have to descend through the rising column of liquid, solids and froth.

12. In an apparatus of the character described, a fluid substance circulating and diffusion impeller comprising a hollow hub member secured to a hollow driving shaft, a plurality of solid impeller blades radially disposed from the hub, each blade presenting an inclined impelling surface and a rear edge disposed substantially at right angles to the impelling surface to form a cavitation pocket in the fluid substance behind each blade and located wholly exteriorly of the solid blade and said hub having a plurality of openings formed therein immediately behind the blades, one opening for each cavitation pocket and in alignment therewith to supply a fluid to said cavitation pockets which is diffused by the impeller, and a rearwardly extending ear on the outer end of each impeller blade, said ears having a shape substantially the same as the cavitation pockets formed behind the blades.

13. In an apparatus of the character described, a container for the reception of a fluid, a vertically disposed deflector disposed adjacent to the bottom of the container and wholly submerged in the fluid, said deflector being open at the top and the bottom, and an impeller located within the deflector and surrounded by the same and revolving in a horizontal plane and having a hub and a plurality of blades with openings between each blade, each blade having an impelling surface facing upwardly and a blunt rear edge to form a cavitation pocket at the back of the blade, said impeller being provided with means to introduce a second fluid from the hub to the rear edge of each blade at the cavitation pocket and operating to cause circulation of fluid in the container and introduce and diffuse in it said second fluid.

14. In an apparatus of the character described, a container for the reception of a fluid, a vertically disposed deflector disposed adjacent to the bottom of the container and wholly submerged in the fluid, said deflector being open at the top and the bottom, an impeller located within the deflector and surrounded by the same and revolving in a horizontal plane and having a hub and a plurality of blades with openings between each blade, each blade having an impelling surface facing upwardly and a blunt rear edge to form a cavitation pocket at the back of the blade, said impeller being provided with means to introduce a second fluid from the hub to the rear edge of each blade at the cavitation pocket and operating to cause circulation of fluid in the container and introduce and diffuse in it said second fluid, and a perforated cover over the top of the deflector.

15. In an apparatus of the character described, a container for the reception of a fluid, a vertically disposed deflector disposed adjacent to the bottom of the container and wholly submerged in the fluid, said deflector being open at the top and the bottom, an impeller located within the deflector and surrounded by the same and revolving in a horizontal plane and having a hub and a plurality of blades with openings between each blade, each blade having an impelling surface facing upwardly and a blunt rear edge to form a cavitation pocket at the back of the blade, said impeller being provided with means to introduce a second fluid from the hub to the rear edge of each blade at the cavitation pocket and operating to cause circulation of fluid in the container and introduce and diffuse in it said second fluid, and a plurality of horizontal, radial vanes secured at the upper part of the deflector immediately above the impeller.

16. In an apparatus of the character described, a container for the reception of a fluid, a vertically disposed deflector disposed adjacent to the bottom of the container and wholly submerged in the fluid, said deflector being open at the top and the bottom, an impeller located within the deflector and surrounded by the same and revolving in a horizontal plane and having a hub and a plurality of blades with openings between each blade, each blade having an impelling surface facing upwardly and a blunt rear edge to form a cavitation pocket at the back of the blade, said impeller being provided with means to introduce a second fluid from the hub to the rear edge of each blade at the cavitation pocket and operating to cause circulation of fluid in the container and introduce and diffuse in it said second fluid, a plurality of horizontal, radial vanes secured at the upper part of the deflector immediately above the impeller, and a perforated cover over the top of the deflector.

17. In a flotation cell, a tank for holding pulp of a sufficiently large horizontal area to permit recirculation of a portion of said pulp, impeller means situated near the bottom of said tank and substantially centrally located therein and so shaped as to induce a rapid positive flow in an upward expanding direction, means to mix a fluid medium with said pulp, to thereby form with said pulp a bubble column with a layer of froth at the upper surface of the pulp, froth overflow means at the upper edge of said tank, and a froth discharger expanded at top and contracted at bottom with fixed inclined sides substantially centrally located with respect to said bubble column and vertically adjustable to regulate the strength and velocity of said bubble column and depth and extent of said froth layer, and having such dimensions as to allow a substantial upward flow of propeller discharge at all adjustments of froth discharger.

LEWIS DRIVER DRAKE.
WILLIAM M. GARDELLA.